United States Patent
Korenaga

(10) Patent No.: US 10,876,451 B2
(45) Date of Patent: Dec. 29, 2020

(54) VEHICLE AND CONTROL METHOD FOR VEHICLE

(71) Applicant: TOYOTA JIDOSHA KABUSHIKI KAISHA, Toyota (JP)

(72) Inventor: Shingo Korenaga, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/545,094

(22) Filed: Aug. 20, 2019

(65) Prior Publication Data
US 2020/0072108 A1 Mar. 5, 2020

(30) Foreign Application Priority Data
Aug. 31, 2018 (JP) .................................. 2018-163280

(51) Int. Cl.
| | | |
|---|---|---|
| *F01N 3/20* | (2006.01) | |
| *F02D 41/02* | (2006.01) | |
| *F01N 11/00* | (2006.01) | |
| *F02D 41/14* | (2006.01) | |

(52) U.S. Cl.
CPC ............ *F01N 3/2026* (2013.01); *F01N 11/00* (2013.01); *F02D 41/0235* (2013.01); *F01N 2900/1628* (2013.01); *F02D 2041/1472* (2013.01)

(58) Field of Classification Search
CPC ...... B60W 10/06; B60W 10/08; B60W 20/16; F01N 3/2026; F01N 9/00; F01N 11/00; F01N 2900/1628; F02D 41/0235; F02D 2041/1472

USPC .................. 60/274, 277, 286, 295, 299, 300
See application file for complete search history.

(56) References Cited

U.S. PATENT DOCUMENTS

| | | | | |
|---|---|---|---|---|
| 10,301,991 | B1 * | 5/2019 | Dudar ................ | F02M 25/0872 |
| 2010/0269805 | A1 * | 10/2010 | Fukuda ................ | F02D 41/222 |
| | | | | 123/690 |
| 2011/0265460 | A1 | 11/2011 | Hirai et al. | |
| 2015/0285117 | A1 * | 10/2015 | Yoshioka ................ | F01N 11/00 |
| | | | | 73/114.75 |

FOREIGN PATENT DOCUMENTS

| | | |
|---|---|---|
| JP | 2010-256994 A | 11/2010 |
| JP | 2011-231710 A | 11/2011 |
| JP | 2012-107567 A | 6/2012 |

\* cited by examiner

*Primary Examiner* — Audrey K Bradley
*Assistant Examiner* — Dapinder Singh
(74) *Attorney, Agent, or Firm* — Oliff PLC

(57) ABSTRACT

A vehicle comprising an internal combustion engine, an electrical heated type catalyst device provided in an exhaust passage of the internal combustion engine and including a conductive substrate generating heat upon energization and a catalyst heated through the conductive substrate, and a control device, the control device comprising an internal moisture calculating part calculating an amount of internal moisture comprised of an amount of moisture present at an inside of the catalyst device and an engine output control part controlling the output of the internal combustion engine based on a required vehicle output and the amount of internal moisture. The engine output control part is configured so that if moisture is present at the inside of the catalyst device, it restricts the output of the internal combustion engine to a lower output when the internal moisture is large compared to when it is small.

6 Claims, 9 Drawing Sheets

VEHICLE AND CONTROL METHOD FOR VEHICLE

FIELD

The present disclosure relates to a vehicle and a control method for a vehicle.

BACKGROUND

Japanese Unexamined Patent Publication No. 2011-231710 discloses a hybrid vehicle provided with an internal combustion engine and electric motor as sources of drive power and provided with an electrical heated type catalyst device (EHC) in an exhaust passage of the internal combustion engine. The electrical heated type catalyst device is configured to be able to heat a catalyst supported on a substrate by a substrate held inside the exhaust passage and generating heat upon energization. By providing an electrical heated type catalyst device, it is possible to warm up the catalyst device before startup of the internal combustion engine.

In the aspect of the disclosure described in Japanese Unexamined Patent Publication No. 2011-231710, if ending up heating the substrate in a state where moisture is contained inside of a porous substrate, the moisture explosively boils inside of the substrate. Due to the steam produced at this time, the pressure inside the substrate rapidly rises and the substrate is liable to be made to deteriorate, so if moisture is contained inside of the substrate, low power control is performed to lower more than usual the electric power supplied to the substrate when heating the substrate. Due to this, it is possible to make the moisture contained inside of the substrate slowly and gradually evaporate, so it is considered possible to prevent deterioration of the substrate due to explosive boiling.

SUMMARY

However, if a substrate is heated in a state where moisture is present on the surface or inside of the substrate, that is, in a state where moisture is present at the inside of the catalyst device, in addition to deterioration of the substrate due to explosive boiling, the substrate sometimes deteriorates due to a temperature difference arising inside the substrate. Further, if the internal combustion engine is started up while heating the substrate, even if lowering the electric power supplied to the substrate like in Japanese Unexamined Patent Publication No. 2011-231710, the substrate is heated by the high temperature exhaust, so the substrate is liable to deteriorate if moisture is present inside of the catalyst device.

The present disclosure was made focusing on such a problem and has as its object to keep a substrate from deteriorating when the substrate is heated in the state where there is moisture inside a catalyst device.

To solve the above problem, the vehicle according to one aspect of the present disclosure is provided with an internal combustion engine, an electrical heated type catalyst device provided in an exhaust passage of the internal combustion engine and including a conductive substrate generating heat upon energization and a catalyst heated through the conductive substrate, and a control device. The control device is provided with an internal moisture calculating part calculating an amount of internal moisture comprised of the amount of moisture present inside of the catalyst device and an engine output control part controlling the output of the internal combustion engine based on the required vehicle output and the amount of internal moisture. Further, the engine output control part is configured so as to restrict the output of the internal combustion engine when moisture is present inside of the catalyst device to a lower output when the amount of internal moisture is large compared to when it is small.

Further, the control method according to one aspect of the present disclosure for a vehicle provided with an internal combustion engine and an electrical heated type catalyst device provided in an exhaust passage of the internal combustion engine and including a conductive substrate generating heat upon energization and a catalyst heated through the conductive substrate comprises an internal moisture calculation step calculating an amount of internal moisture comprised of an amount of moisture present inside of the catalyst device and an engine output control step controlling an output of the internal combustion engine based on a required vehicle output and amount of internal moisture. The engine output control step is designed to restrict the output of the internal combustion engine when moisture is present inside of the catalyst device to a lower output when the amount of internal moisture is large compared to when it is small.

According to these aspects of the present disclosure, it is possible to keep a substrate from deteriorating when a substrate is heated in a state where moisture is present inside a catalyst device.

DESCRIPTION OF EMBODIMENTS

Figure 1:
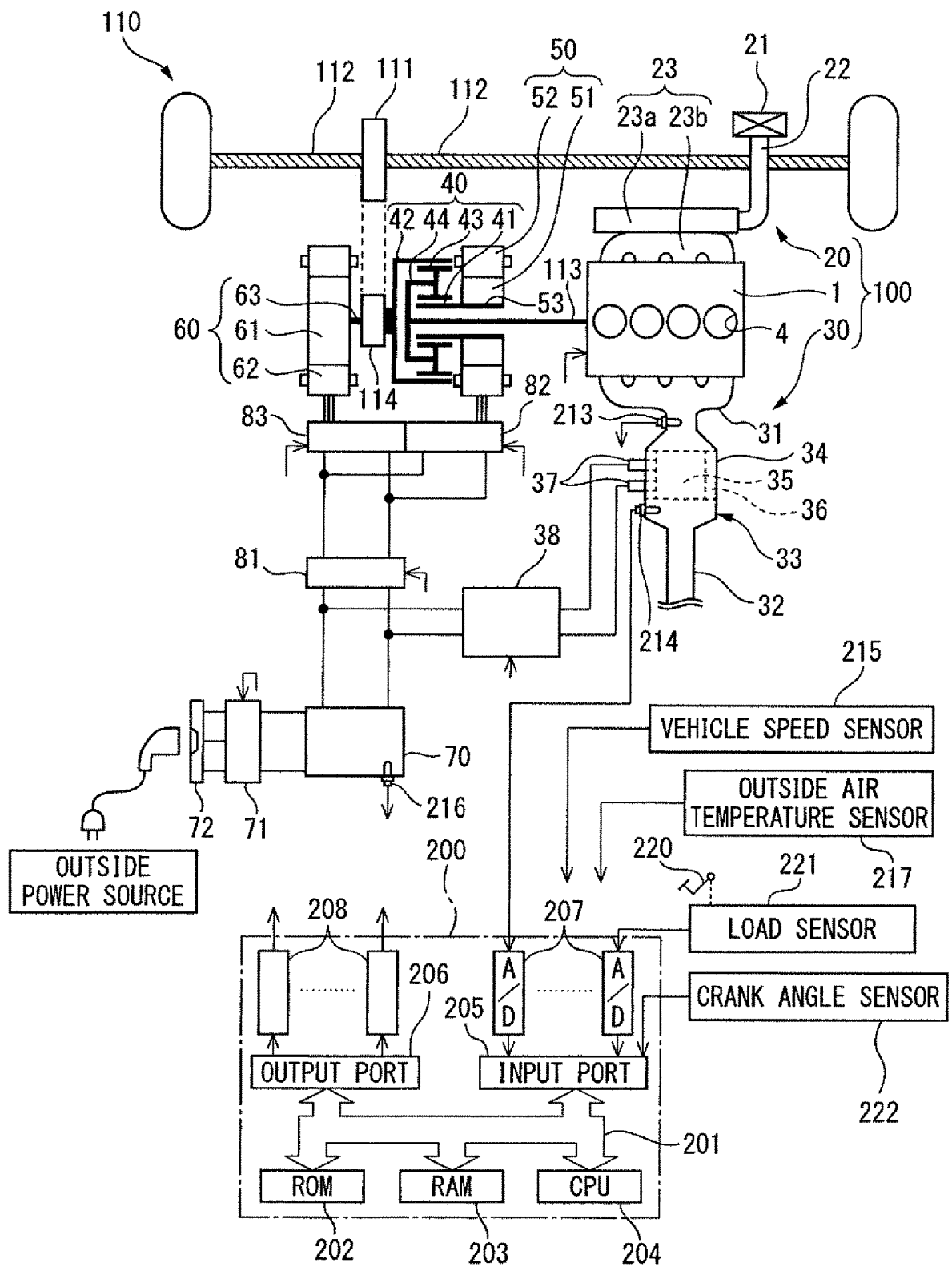
FIG. 1 is a schematic view of the configuration of a vehicle and an electronic control unit for controlling the vehicle according to a first embodiment of the present disclosure.

Below, referring to the drawings, embodiments of the present disclosure will be explained in detail. Note that, in the following explanation, similar component elements are assigned the same reference notations.

First Embodiment

FIG. 1 is a schematic view of the configuration of a vehicle 110 and an electronic control unit 200 for controlling the vehicle 110 according to a first embodiment of the present disclosure.

The vehicle 110 according to the present embodiment is a hybrid vehicle provided with an internal combustion engine 100, power distribution mechanism 40, first electric rotating machine 50, second electric rotating machine 60, battery 70, booster converter 81, first inverter 82, and second inverter 83 and configured to enable one or both of drive powers of the two sources of drive power of the internal combustion engine 100 and second electric rotating machine 60 to be transmitted to a wheel drive shaft 112 through a final reduction gear 111.

The internal combustion engine 100 is provided with an engine body 1, intake system 20, and exhaust system 30 and generates drive power for making an output shaft 113 connected to a crankshaft of the engine body 1 (not shown) rotate. Below, referring to FIG. 2 as well, the detailed configuration of the internal combustion engine 100 will be explained.

Figure 2:
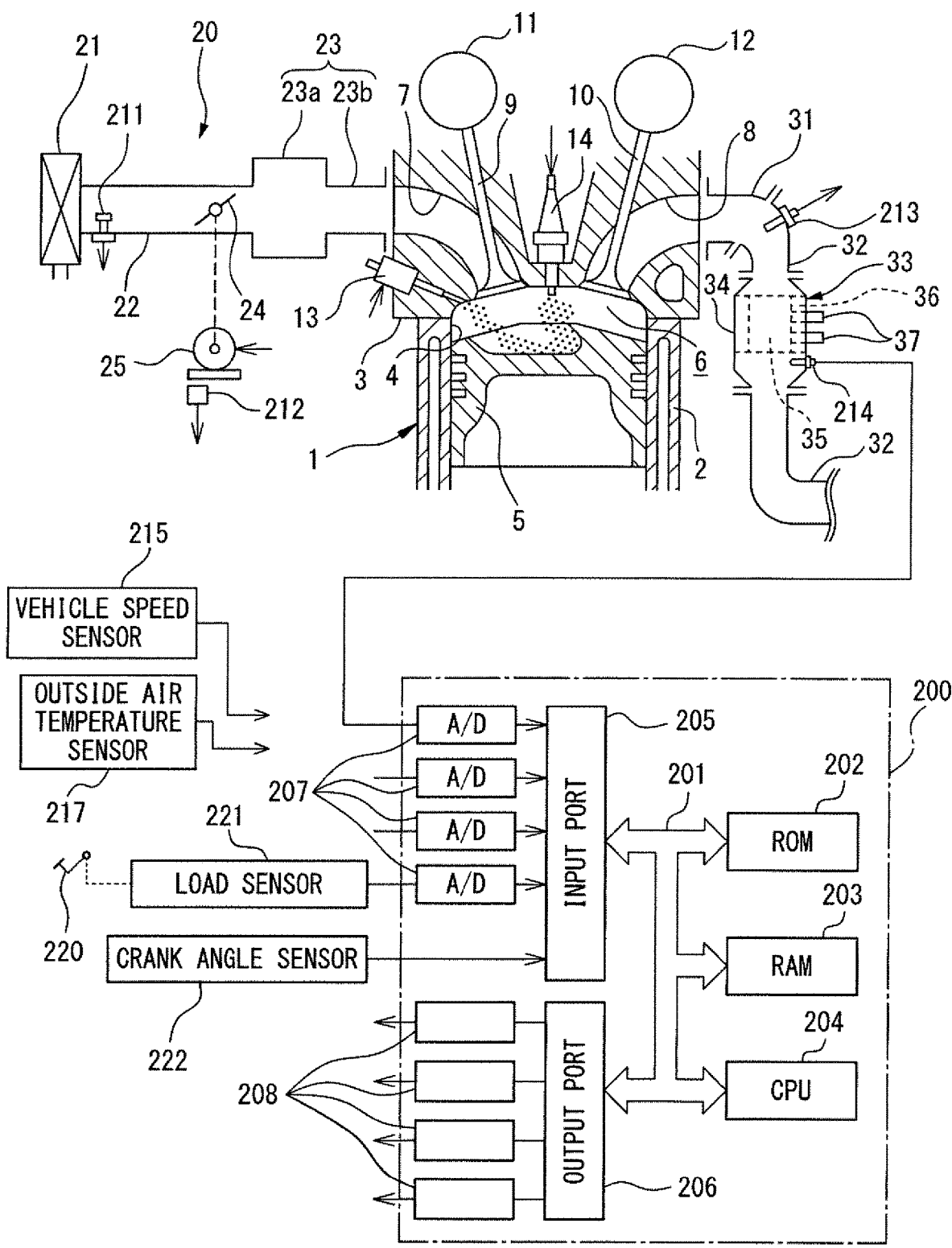
FIG. 2 is a view explaining a detailed configuration of an internal combustion engine according to the first embodiment of the present disclosure.

As shown in FIG. 2, the engine body 1 is provided with a cylinder block 2 and a cylinder head 3 fixed to a top surface of the cylinder block 2.

The cylinder block 2 is formed with a plurality of cylinders 4. Inside of each cylinder 4, a piston 5 which receives combustion pressure and reciprocates inside the cylinder 4 is held. The pistons 5 are connected through connecting rods (not shown) to a crankshaft (not shown). Due to the crankshaft, the reciprocating motions of the pistons 5 are converted to rotary motion. The spaces defined by the inside wall surface of the cylinder head 3, the inside wall surfaces of the cylinders 4, and the piston crowns form combustion chambers 6.

The cylinder head 3 is formed with intake ports 7 which open to one side of the cylinder head 3 and open to the combustion chambers 6 and exhaust ports 8 which open to the other side of cylinder head 3 and open to the combustion chambers 6.

Further, the cylinder head 3 has attached to it intake valves 9 for opening and closing the openings of the combustion chambers 6 and intake ports 7, exhaust valves 10 for opening and closing the openings of the combustion chambers 6 and exhaust ports 8, intake cam shafts 11 for driving operation of the intake valves 9, and exhaust cam shafts 12 for driving operation of the exhaust valves 10. At one end of the intake cam shaft 11, a hydraulic variable valve mechanism (not shown) capable of setting the opening/closing timing of the intake valve 9 to an arbitrary timing is provided.

Still further, the cylinder head 3 has attached to it fuel injectors 13 for injecting fuel inside the combustion chambers 6 and spark plugs 14 for igniting the air-fuel mixture of the fuel injected from the fuel injectors 13 and the air inside the combustion chambers 6. In the present embodiment, as the fuel, gasoline having a stoichiometric air-fuel ratio of 14.6 is used, but other fuel may also be used. Note that, the fuel injectors 13 may also be attached so as to inject fuel inside the intake ports 7.

The intake system 20 is a system for guiding air through the intake ports 7 to the insides of the cylinders 4 and is provided with an air cleaner 21, intake pipe 22, intake manifold 23, electronic control type throttle valve 24, and air flow meter 211.

The air cleaner 21 removes sand and other foreign matter contained in the air.

The intake pipe 22 is connected at one end to the air cleaner 21 and is connected at the other end with a surge tank 23a of the intake manifold 23. Due to the intake pipe 22, air flowing through the air cleaner 21 to the inside of the intake pipe 22 (intake) is guided to the surge tank 23a of the intake manifold 23.

The intake manifold 23 is provided with the surge tank 23a and a plurality of intake runners 23b branched from the surge tank 23a and connected to the openings of the intake ports 7 formed at the side surface of the cylinder head. The air guided to the surge tank 23a is evenly distributed through the intake runners 23b to the insides of the cylinders 4. In this way, the intake pipe 22, the intake manifold 23, and intake ports 7 form intake passages for guiding air to the insides of the cylinders 4.

The air flow meter 211 is provided inside the intake pipe 22. The air flow meter 211 detects the flow rate of air flowing through the inside of the intake pipe 22 (below, referred to as the "intake amount").

The throttle valve 24 is provided inside the intake pipe 22 at a downstream side from the air flow meter 211. The throttle valve 24 is driven by a throttle actuator 25 and changes the passage cross-sectional area of the intake pipe 22 continuously or in stages. By using the throttle actuator 25 to adjust the opening degree of the throttle valve 24 (below, referred to as the "throttle opening degree"), the amounts of intake sucked into the cylinders 4 are adjusted. The throttle opening degree is detected by a throttle sensor 212.

The exhaust system 30 is a system for purifying combustion gas generated inside the combustion chambers 6 (below, referred to as the "exhaust") and discharging it into the outside air and is provided with an exhaust manifold 31, exhaust pipe 32, exhaust temperature sensor 213, and electrical heated type catalyst device 33.

The exhaust manifold 31 is provided with a plurality of exhaust runners 31a connected to openings of exhaust ports 8 formed at the side surface of the cylinder head and a header pipe 31b gathering the exhaust runners 31a and combining them into one.

The exhaust pipe 32 is connected at one end to the header pipe 31b of the exhaust manifold 31 and opens at the other end to the outside air. The exhaust discharged from the cylinders 4 through the exhaust ports 8 to the exhaust manifold 31 flows through the exhaust pipe 32 and is discharged to the outside air.

The exhaust temperature sensor 213 is provided at the exhaust pipe 32 at the upstream side from the catalyst device 33 and detects the temperature of the exhaust flowing into the catalyst device 33.

The electrical heated type catalyst device 33 is provided with an outer tube 34 attached to the exhaust pipe 32, a conductive substrate 35, a holding mat 36, a pair of electrodes 37, and a substrate temperature sensor 214.

The outer tube 34 is a part for holding the conductive substrate 35 inside it and typically is a case made of stainless steel or other metal or a ceramic or other nonmetal material.

The conductive substrate 35 is, for example, formed by a material generating heat upon energization such as silicon carbide (SiC) or molybdenum disilicide ($MoSi_2$). The conductive substrate 35 according to the present embodiment is a so-called honeycomb type support in which a plurality of exhaust flow passages 35a (see FIG. 3(a)) are formed along the direction of flow of exhaust. A catalyst is supported on the surfaces of the exhaust flow passages 35a. In the present embodiment, the conductive substrate 35 supports a three-way catalyst, but the type of catalyst supported on the conductive substrate 35 is not particularly limited. It is possible to suitably select for support the catalyst required for obtaining the desired exhaust purification performance from among various catalysts.

The holding mat 36 is a part provided between the outer tube 34 and the conductive substrate 35 so as to fill a clearance between the outer tube 34 and the conductive substrate 35 and for holding the conductive substrate 35 at a predetermined position inside the outer tube 34. The holding mat 36 is, for example, formed by an electrically insulating material such as alumina ($Al_2O_3$).

The pair of electrodes 37 are parts for applying voltage to the conductive substrate 35. They are electrically connected to the conductive substrate 35 in a state electrically insulated from the outer tube 34 and, as shown in FIG. 1, are connected to the battery 70 through a voltage adjustment circuit 38 for adjusting the voltage applied to the conductive substrate 35. By applying voltage to the conductive substrate 35 through the pair of electrodes 37 to supply power to the conductive substrate 35, current flows through the conductive substrate 35, the conductive substrate 35 generates heat, and the catalyst supported on the conductive substrate 35 is heated. The voltage applied by the pair of electrodes 37 to the conductive substrate 35 can be adjusted by the electronic control unit 200 controlling the voltage adjustment circuit 38. For example, it is also possible to apply voltage of the battery 70 as it is and possible to apply the voltage of the battery 70 adjusted to any voltage.

The substrate temperature sensor 214 is provided in the vicinity of the conductive substrate 35 and at the outer tube 34 at the downstream side from the conductive substrate 35. In the present embodiment, the temperature of the conductive substrate 35 (below, referred to as the "substrate temperature") or the temperature of the catalyst supported on the conductive substrate 35 can be calculated by being estimated by the electronic control unit 200 based on the detected value of this substrate temperature sensor 214 etc.

The exhaust port 8, exhaust manifold 31, exhaust pipe 32, and outer tube 34 form an exhaust passage through which exhaust discharged from the cylinders 4 flows.

Note that, in the present embodiment, as one example of the internal combustion engine 100, the above such nonsupercharged gasoline engine was explained as an example, but the disclosure is not limited to the above configuration. The mode of combustion, cylinder array, mode of injection of fuel, configuration of the intake and exhaust systems, configuration of the valve operating mechanism, presence of any supercharger, supercharging mode, etc. may differ from the above configuration.

Returning to FIG. 1, the power distribution mechanism 40 is a planetary gear for dividing the power of the internal combustion engine 100 into the two systems of drive power for making the wheel drive shaft 112 turn and drive power for driving a recycling action of the first electric rotating machine 50 and is provided with a sun gear 41, ring gear 42, pinion gear 43, and planetary carrier 44.

The sun gear 41 is an external gear and is arranged at the center of the power distribution mechanism 40. The sun gear 41 is connected with a shaft 53 of the first electric rotating machine 50.

The ring gear 42 is an internal gear and is arranged around the sun gear 41 so as to become concentric with the sun gear 41. The ring gear 42 is connected with a shaft 63 of the second electric rotating machine 60. Further, the ring gear 42 has integrally attached to it a drive gear 114 for transmitting rotation of the ring gear 42 to the wheel drive shaft 112 through the final deceleration device 111.

A pinion gear 43 is an external gear. A plurality are arranged between the sun gear 41 and ring gear 42 so as to mesh with the sun gear 41 and ring gear 42.

The planetary carrier 44 is connected to the output shaft 113 of the internal combustion engine 100 and rotates about the output shaft 113. Further, the planetary carrier 44 is also connected to the pinion gears 23 so as to enable the pinion gears 43 to revolve (orbit) around the sun gear 41 while individually rotating on their axes when the planetary carrier 44 rotates.

The first electric rotating machine 50 is, for example, a three-phase AC synchronous type motor-generator and is provided with a rotor 51 attached to the outer circumference of the shaft 53 coupled with the sun gear 41 and having a plurality of permanent magnets embedded in its outer circumference and a stator 52 around which is wound an excitation coil generating a rotating magnetic field. The first electric rotating machine 50 has the function of a motor receiving the supply of power from the battery 70 and being driven in a power running mode and the function of a generator receiving power from the internal combustion engine 100 and being driven in a regeneration mode.

In the present embodiment, the first electric rotating machine 50 is mainly used as a generator. Further, when making the output shaft 113 rotate for cranking at the time of startup of the internal combustion engine 100, it is used as a motor and plays the role of a starter.

The second electric rotating machine 60 is, for example, a three-phase AC synchronous type motor-generator. It is provided with a rotor 61 attached to the outer circumference of the shaft 53 connected to the ring gear 42 and having a plurality of permanent magnets embedded in its outer circumferential part and with a stator 62 around which an excitation coil generating a rotating magnetic field is wound. The second electric rotating machine 60 has the function as a motor receiving the supply of power from a battery 70 and being driven in a power running mode and the function as a generator receiving power from the wheel drive shaft 112 and being driven in a regeneration mode at the time of deceleration of the vehicle 110 etc.

The battery 70 is, for example, a nickel-cadmium storage battery or nickel-hydrogen storage battery, lithium ion battery, or other rechargeable secondary battery. In the present embodiment, as the battery 70, a lithium ion secondary battery with a rated voltage of 200V or so is used. The battery 70 is electrically connected through a boost converter 81 etc. to the first electric rotating machine 50 and second electric rotating machine 60 so as to enable charged power of the battery 70 to be supplied to the first electric rotating machine 50 and second electric rotating machine 60 and drive them in the power running mode and, further, so as to enable the generated power of the first electric rotating machine 50 and second electric rotating machine 60 to charge the battery 70. Further, the battery 70 is also electrically connected through the voltage adjustment circuit 38 and the pair of electrodes 37 to the conductive substrate 35 so as to supply the charged power of the battery 70 to the conductive substrate 35 to thereby heat the conductive substrate 35.

Furthermore, the battery 70 is, for example, configured to be able to be electrically connected to an external power supply through a charging control circuit 71 and a charging lid 72 so that charging from a household power outlet or other external power supply becomes possible. The vehicle 100 according to the present embodiment is made a so-called "plug-in hybrid vehicle". The charging control circuit 71 is an electrical circuit able to convert AC current supplied from the external power supply to DC current based on a control signal from the electronic control unit 200 and boost the input voltage to the battery voltage to charge the electric power of the external power supply to the battery 70. Note that, the battery 70 does not necessarily have to be configured to be able to be charged by an external power source.

The boost converter 81 is provided with an electrical circuit boosting the terminal voltage of the primary side terminal and outputting it from the secondary side terminal based on a control signal from the electronic control unit 200 and conversely lowering the terminal voltage of the secondary side terminal and outputting it from the primary side terminal based on a control signal from the electronic control unit 200. The primary side terminal of the boost converter 81 is connected to the output terminal of the battery 70, while the secondary side terminal is connected to the DC side terminals of the first inverter 82 and second inverter 83.

The first inverter 82 and second inverter 83 are provided with electrical circuits enabling them to convert direct currents input from the DC side terminals to alternating currents (in the present embodiment, three-phase alternating currents) and output them from the AC side terminals based on a control signal from the electronic control unit 200 and conversely to convert alternating currents input from the AC side terminals to direct currents and output them from the DC side terminals based on a control signal of the electronic control unit 200. The DC side terminal of the first inverter 82 is connected to the secondary side terminal of the boost converter 81, while the AC side terminal of the first inverter 82 is connected to the input/output terminal of the first electric rotating machine 50. The DC side terminal of the second inverter 83 is connected to the secondary side terminal of the boost converter 81, while the AC side terminal of the second inverter 83 is connected to the input/output terminal of the second electric rotating machine 60.

The electronic control unit 200 is comprised of a digital computer and is provided with components connected to each other by a bidirectional bus 201 such as a ROM (read only memory) 202, RAM (random access memory) 203, CPU (microprocessor) 204, input port 205, and output port 206.

At the input port 205, in addition to the above-mentioned air flow meter 211 etc., the output signals of the vehicle speed sensor 215 for detecting the vehicle speed, the SOC sensor 216 for detecting the state of charge of the battery, the outside air temperature sensor 217 for detecting the outside air temperature, etc. are input through the corresponding AD converters 207. Further, at the input port 205, the output voltage of the load sensor 221 generating an output voltage proportional to the amount of depression of the accelerator pedal 220 (below, referred to as the "amount of accelerator depression") is input through the corresponding AD converter 207. Further, at the input port 205, as signals for calculating the engine speed, the output signal of the crank angle sensor 222 generating an output pulse each time the crankshaft of the engine body 1 rotates by for example 15° is input. In this way, at the input port 205, output signals of various types of sensors required for controlling the vehicle 110 are input.

The output port 206 is electrically connected to the fuel injectors 13 and other controlled parts through the corresponding drive circuits 208.

The electronic control unit 200 outputs control signals for controlling the controlled parts and controls the vehicle 110 based on the output signals of the various sensors input to the input port 205. Below, the control of the vehicle 110 performed by the electronic control unit 200 will be explained.

The electronic control unit 200 sets the driving mode of the vehicle 110 based on the state of charge of the battery. Specifically, the electronic control unit 200 sets the driving mode of the vehicle 110 to the EV (electric vehicle) mode when the state of charge of the battery is larger than a predetermined mode switching state of charge (for example, 25% of a state of full charge). The EV mode will sometimes be called a CD (charge depleting) mode.

When the driving mode of the vehicle 110 is set to the EV mode, the electronic control unit 200 basically uses the charged power of the battery 70 in the state making the internal combustion engine 100 stop so as to drive the powered operation of the second electric rotating machine 60 and make the wheel drive shaft 112 turn by just the drive power of the second electric rotating machine 60. Further, when predetermined engine operating conditions stand, the electronic control unit 200 as an exception operates the internal combustion engine 100 and makes the wheel drive shaft 112 rotate by both drive forces of the internal combustion engine 100 and second electric rotating machine 60.

The engine operating conditions in the EV mode are set from the viewpoint of securing the driving performance of the vehicle 110 or protecting the parts, so, for example, when the vehicle speed becomes a predetermined vehicle speed (for example, 100 km/h) or more or when the amount of accelerator depression increases and the required vehicle output Pt set based on the amount of accelerator depression (vehicle load) and vehicle speed becomes a predetermined output or more (typically at the time of requiring rapid acceleration) and the battery temperature becomes a predetermined temperature (for example −10° C.) or less etc. may be mentioned.

In this way, the EV mode is the mode of preferentially utilizing the charged power of the battery 70 for driving the powered operation of the second electric rotating machine 60 and transmitting at least the drive power of the second electric rotating machine 60 to the wheel drive shaft 112 to drive the vehicle 110.

On the other hand, the electronic control unit 200 sets the driving mode of the vehicle 110 to the HV (hybrid vehicle) mode when the state of charge of the battery is the mode switching state of charge or less. The HV mode will sometimes be called the CS (charge sustaining) mode.

When the driving mode of the vehicle 110 is set to the HV mode, the electronic control unit 200 divides the power of the internal combustion engine 100 into two systems by the power distribution mechanism 40, transmits one of the divided drive powers of the internal combustion engine 100 to the wheel drive shaft 112, and uses the other drive power to drive the regenerative operation of the first electric rotating machine 50. Further, basically, the generated electric power of the first electric rotating machine 50 is used to drive the powered operation of the second electric rotating machine 60 and the drive power of the second electric rotating machine 60 is transmitted to the wheel drive shaft 112 in addition to the one drive power of the internal combustion engine 100. As an exception, for example, when the amount of accelerator depression increases and the required vehicle output becomes a predetermined output or more etc., to secure the driving performance of the vehicle 110, the generated electric power of the first electric rotating machine 50 and the charged power of the battery 70 are used to drive the powered operation of the second electric rotating machine 60 and both drive powers of the internal combustion engine 100 and second electric rotating machine 60 are transmitted to the wheel drive shaft 112.

In this way, the HV mode is a mode in which the internal combustion engine 100 is made to operate, the electric power generated by first electric rotating machine 50 is preferentially utilized to drive powered operation of the second electric rotating machine 60, and both drive powers of the internal combustion engine 100 and second electric rotating machine 60 are transmitted to the wheel drive shaft 112 to drive the vehicle 110.

In this way, in the hybrid vehicle, basically, when the driving mode is switched from the EV mode to the HV mode, the internal combustion engine 100 is started up. Further, the EV mode is switched to the HV mode basically dependent on the state of charge of the battery.

In this regard, during operation of the internal combustion engine 100, in order for the catalyst device 33 to exhibit the desired exhaust purification performance, it is necessary to make the temperature of the catalyst supported on the conductive substrate 35 rise to the activation temperature to activate the catalyst. For this reason, to keep the exhaust emission after engine startup from deteriorating, during the EV mode, it is desirable to start the energization of the conductive substrate 35 to start warm-up of the catalyst device 33 and end warm-up of the catalyst device 33 before switching to the HV mode. Therefore, in the present embodiment, if the state of charge of the battery during the EV mode falls to the warm-up start state of charge larger than the mode switching state of charge, the conductive substrate 35 starts to be energized to try to warm up the catalyst device 33.

At this time, the condensed water generated inside the exhaust passage while the engine is stopped sometimes deposits on the surface of the exhaust flow passages 35a of the conductive substrate 35. Further, if the material forming the conductive substrate 35 is a porous material, that is, if the conductive substrate 35 is a porous member, the condensed water generated inside the exhaust passage while the engine is stopped sometimes enters into and remains in the inside of the conductive substrate 35.

In this way, if starting energization of the conductive substrate 35 to warm up the catalyst device 33 in the state where moisture is present on the surface or inside of the conductive substrate 35, that is, in the state where moisture is present at the inside of the catalyst device 33, the following problem is liable to occur.

Figure 3:
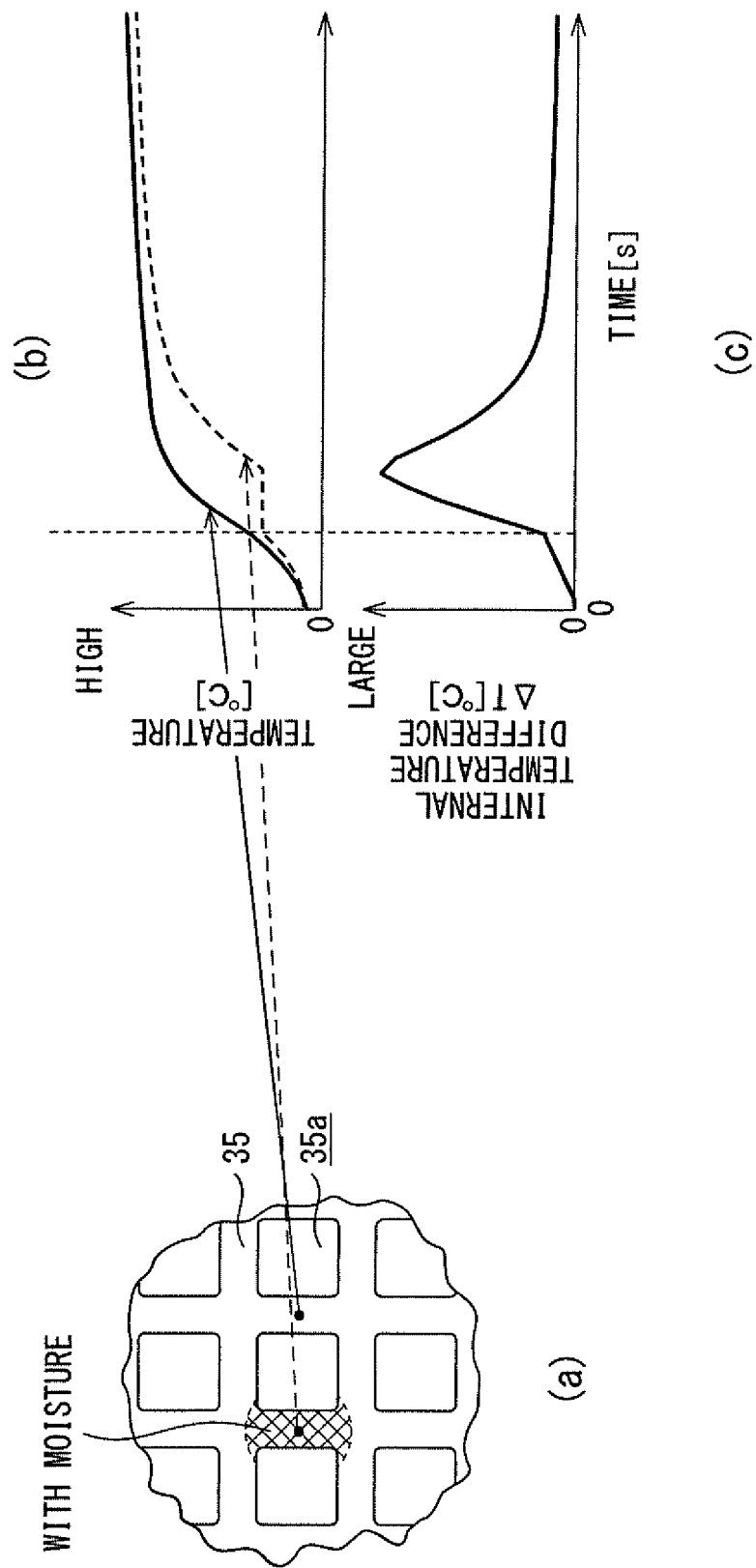
FIG. 3 is a view explaining problem points occurring when starting energization of a conductive substrate to warm up a catalyst device in a state where moisture is present at the surface or inside of the conductive substrate.

FIG. 3 is a view explaining the problem points occurring when starting energization of the conductive substrate 35 to warm up the catalyst device 33 in a state where moisture is present on the surface or inside of the conductive substrate 35.

FIG. 3(a) is a cross-sectional view enlarging part of the catalyst device 33 when cutting the catalyst device 33 in the direction vertically intersecting the direction of flow of exhaust. FIG. 3(b) is a view showing the trends in the temperature of portions of the conductive substrate 35 when raising the temperature of the conductive substrate 35 from the initial temperature corresponding to the outside air temperature toward the activation temperature. The solid line of FIG. 3(b) shows the trend in temperature at a portion at the inside of the conductive substrate 35 where no moisture is present. The broken line of FIG. 3(b) shows the trend in temperature at a portion at the inside of the conductive substrate 35 where moisture is present. FIG. 3(c) is a view showing the trend in the temperature difference $\Delta T$ between a portion of the inside of the conductive substrate 35 where no moisture is present and a portion where moisture is present (below, referred to as the "internal temperature difference").

As shown in FIG. 3(b) by the solid line, at a portion at the inside of the conductive substrate 35 where moisture is not present, the temperature of the conductive substrate 35 increases substantially monotonously along with the elapse of time. On the other hand, as shown in FIG. 3(b) by the broken line, at a portion at the inside of the conductive substrate 35 where moisture is present, there is a time period where the temperature of the conductive substrate 35 dwells near the temperature of evaporation of water. This is because if the temperature of the conductive substrate 35 reaches the temperature of evaporation of water, the moisture evaporates at a portion at the inside of the conductive substrate 35 where moisture is present and the latent heat of evaporation at that time obstructs the rise in temperature of the conductive substrate 35.

As a result, as shown in FIG. 3(c), if ending up starting the energization of the conductive substrate 35 to warm up the catalyst device in the state where moisture is present at the surface or inside of the conductive substrate 35, an internal temperature difference $\Delta T$ is caused. This internal temperature difference $\Delta T$ becomes larger since the larger the amount of moisture partially present at the surface or inside of the conductive substrate 35, that is, the larger the amount of internal moisture Qcw of the catalyst device 33, the longer the evaporation time and the longer the dwelling period. Further, if the internal temperature difference $\Delta T$ becomes larger, a large thermal stress is generated along with this, so this becomes a cause of deterioration of the conductive substrate 35.

As the method for keeping the conductive substrate 35 from deteriorating due to the internal temperature difference $\Delta T$ becoming excessively large, for example, as in the above-mentioned PTL 1, if moisture is present on the surface or inside of the conductive substrate 35, the method of lowering the energization power to the conductive substrate 35 may be considered. Due to this, it is possible to keep down the rate of rise of temperature of a portion at the inside of the conductive substrate 35 where no moisture is present and possible to keep the internal temperature difference $\Delta T$ from becoming excessively large.

However, in a hybrid vehicle, even during the EV mode, for example, sometimes the internal combustion engine 100 is started up when the required vehicle output becomes a predetermined output (later explained required startup output Ps0) or more etc. Sometimes the internal combustion engine 100 is started up before the state of charge of the battery falls to the warm-up start state of charge or before the state of charge of the battery falls to the warm-up start state of charge, then falls to the mode switching state of charge. That is, sometimes the internal combustion engine 100 is started up before starting energization of the conductive substrate 35 or during energization.

If the internal combustion engine 100 is started before the conductive substrate 35 starts to be energized or while it is energized in the state where moisture is present on the surface or inside of the conductive substrate 35, the conductive substrate 35 is heated by the exhaust heat. The exhaust temperature basically is correlated with the output of the internal combustion engine 100 and becomes higher the higher the output of the internal combustion engine 100.

For this reason, if the internal combustion engine 100 is started before the conductive substrate 35 starts to be energized or while it is energized, the rate of rise of temperature of the conductive substrate 35 becomes dependent on the output of the internal combustion engine 100, that is, the exhaust temperature, and the rate of rise of temperature of the conductive substrate 35 can no longer be controlled. As a result, it is not possible to keep down the rate of rise of temperature of a portion at the inside of the conductive substrate 35 where no moisture is present and the internal temperature difference ΔT is liable to become excessively large.

Further, since moisture is present on the surface or inside of the conductive substrate 35, if the state of charge of the battery falls to the warm-up start state of charge, if performing control lowering the energization power of the conductive substrate 35 to start energization of the conductive substrate 35, the time required for raising the temperature of the catalyst supported on the conductive substrate 35 to the activation temperature becomes longer. This being so, the frequency by which the internal combustion engine 100 is started up during energization increases.

Therefore, in the present embodiment, the target output Pe [kW] of the internal combustion engine 100 and the target output Pm [kW] of the second electric rotating machine 60 during the EV mode, set based on the required vehicle output Pt, are made to change in accordance with the amount of internal moisture Qcw [cc] of the catalyst device 33.

Figure 4:
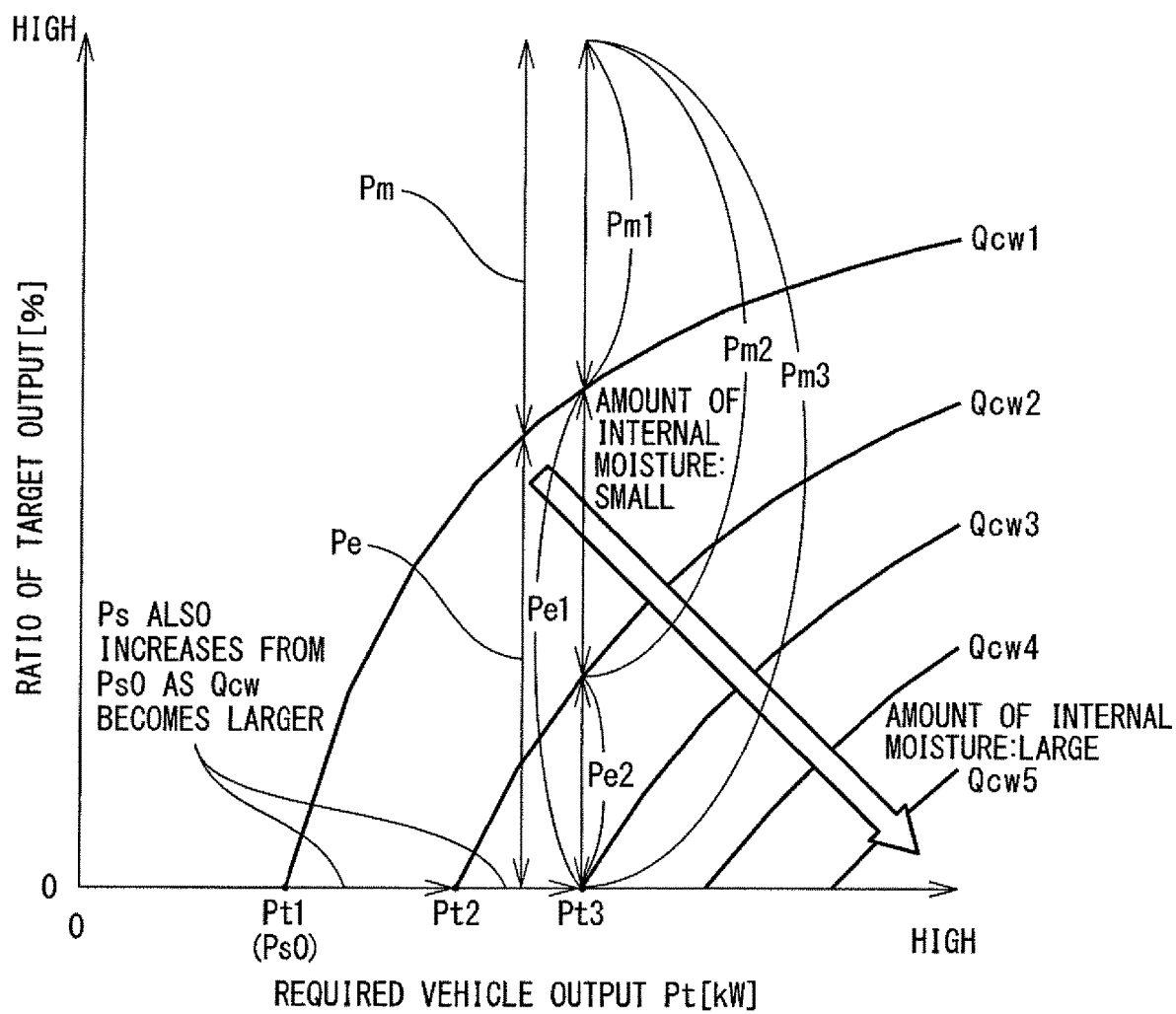
FIG. 4 is a view showing ratios of the target outputs Pe, Pm of the internal combustion engine and second electric rotating machine in a required vehicle output in an EV mode.

FIG. 4 is a view showing the ratios of the target outputs Pe, Pm of the internal combustion engine 100 and second electric rotating machine 60 in the required vehicle output Pt during the EV mode. Note that in FIG. 4, the relative magnitudes of Qcw1 to Qce5 become Qcw1<Qcw2<Qcw3<Qcw4<Qcw5.

As shown in FIG. 4, in the present embodiment, the ratio of the target output Pm of the second electric rotating machine 60 in the required vehicle output Pt was raised and on the other hand the ratio of the target output Pe of the internal combustion engine 100 in the required vehicle output was lowered more when the amount of internal moisture Qcw of the catalyst device 33 was large compared to when it was small.

Due to this, for example, when the required vehicle output Pt is Pt3 shown in FIG. 4, if comparing the sizes of the target outputs Pm1, Pm2, Pm3 of the second electric rotating machine 60 when the amounts of internal moisture Qcw are Qcw1, Qcw2, Qcw3 (Qcw1<Qcw2<Qcw2), the result becomes Pm1<Pm2<Pm3 (=Pt3), while if comparing the sizes of the target outputs Pe1, Pe2, Pe3 of the internal combustion engine 100, the result becomes Pe1>Pe2>Pe3 (=0).

In this way, according to the present embodiment, basically, the greater the amount of internal moisture Qcw, the lower the ratio of the target output Pe of the internal combustion engine 100 in the required vehicle output is made, so even if the required vehicle output Pt is the same Pt3, the output of the internal combustion engine 100 is made lower like Pe1, Pe2, Pe3 as the amount of internal moisture Qcw becomes greater like Qcw1, Qcw2, Qcw3. That is, the greater the amount of internal moisture Qcw, the lower the output which the output of the internal combustion engine 100 is restricted to. Further, in the EV mode, the required startup output Ps forming threshold value of the required vehicle output Pt for starting up the internal combustion engine 100 also becomes higher like Pt1, Pt2, Pt3 as the amount of internal moisture Qcw becomes greater like Qcw1, Qcw2, Qcw3.

In this way, the greater the amount of internal moisture Qcw, the higher the required startup output Ps, so in the EV mode, even if the required vehicle output Pt becomes the required startup output Ps0 (=Pt1) whereby the internal combustion engine 100 is usually started up (below, referred to as the "normal required startup output") (see FIG. 4) or more, when the amount of internal moisture Qcw is large, it is possible to not start up the internal combustion engine 100, but drive the vehicle by only the output of the second electric rotating machine 60. For this reason, before starting energization of the conductive substrate 35 or during energization, it is possible to keep the internal combustion engine 100 from being started up.

Further, even if the internal combustion engine 100 is started up, the greater the amount of internal moisture Qcw, the lower the output the output of the internal combustion engine 100 is restricted to, so it is possible to lower the exhaust temperature. For this reason, even if the internal combustion engine 100 is started up, it is possible to keep the rate of rise of temperature of a portion of the inside of the conductive substrate 35 where no moisture is present and possible to keep the internal temperature difference ΔT from becoming excessively large.

Figure 5:
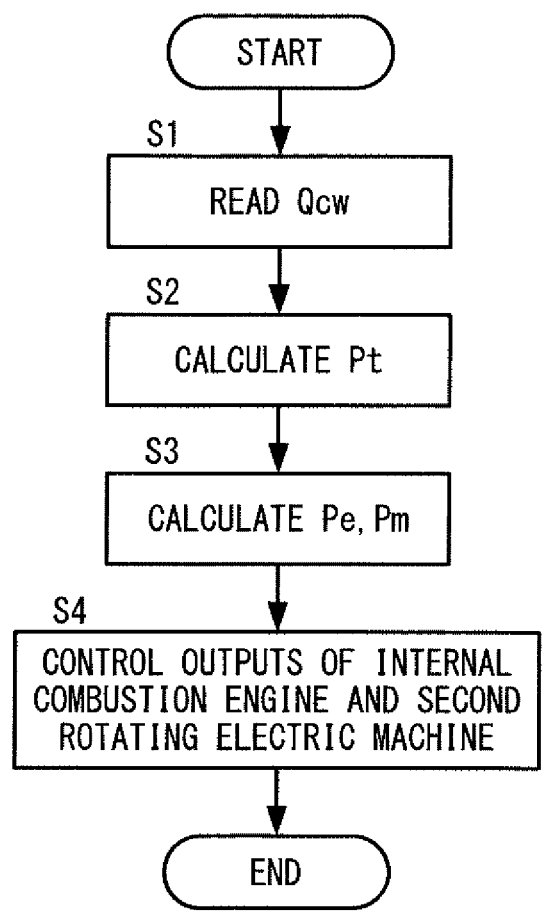
FIG. 5 is a flow chart explaining output control in the EV mode according to the first embodiment of the present disclosure.

FIG. 5 is a flow chart explaining the output control in the EV mode according to the present embodiment. The electronic control unit 200 repeatedly performs the present routine by a predetermined processing cycle in the EV mode.

At step S1, the electronic control unit 200 reads the amount of internal moisture Qcw of the catalyst device 33 calculated separately from the present routine. The method of calculation of the amount of internal moisture Qcw will be explained later with reference to FIG. 6.

At step S2, the electronic control unit 200 calculates the required vehicle output Pt. In the present embodiment, the electronic control unit 200 refers to a map prepared in advance by experiments and calculates the required vehicle output Pt based on the vehicle load and vehicle speed.

At step S3, the electronic control unit 200 refers to the above-mentioned map of FIG. 4 and calculates the target output Pe of the internal combustion engine 100 and the target output Pm of the second electric rotating machine 60 based on the required vehicle output Pt and the amount of internal moisture Qcw.

At step S4, the electronic control unit 200 controls the outputs of the internal combustion engine 100 and second electric rotating machine 60 so that the outputs of the internal combustion engine 100 and second electric rotating machine 60 respectively become the target outputs Pe, Pm.

Figure 6:
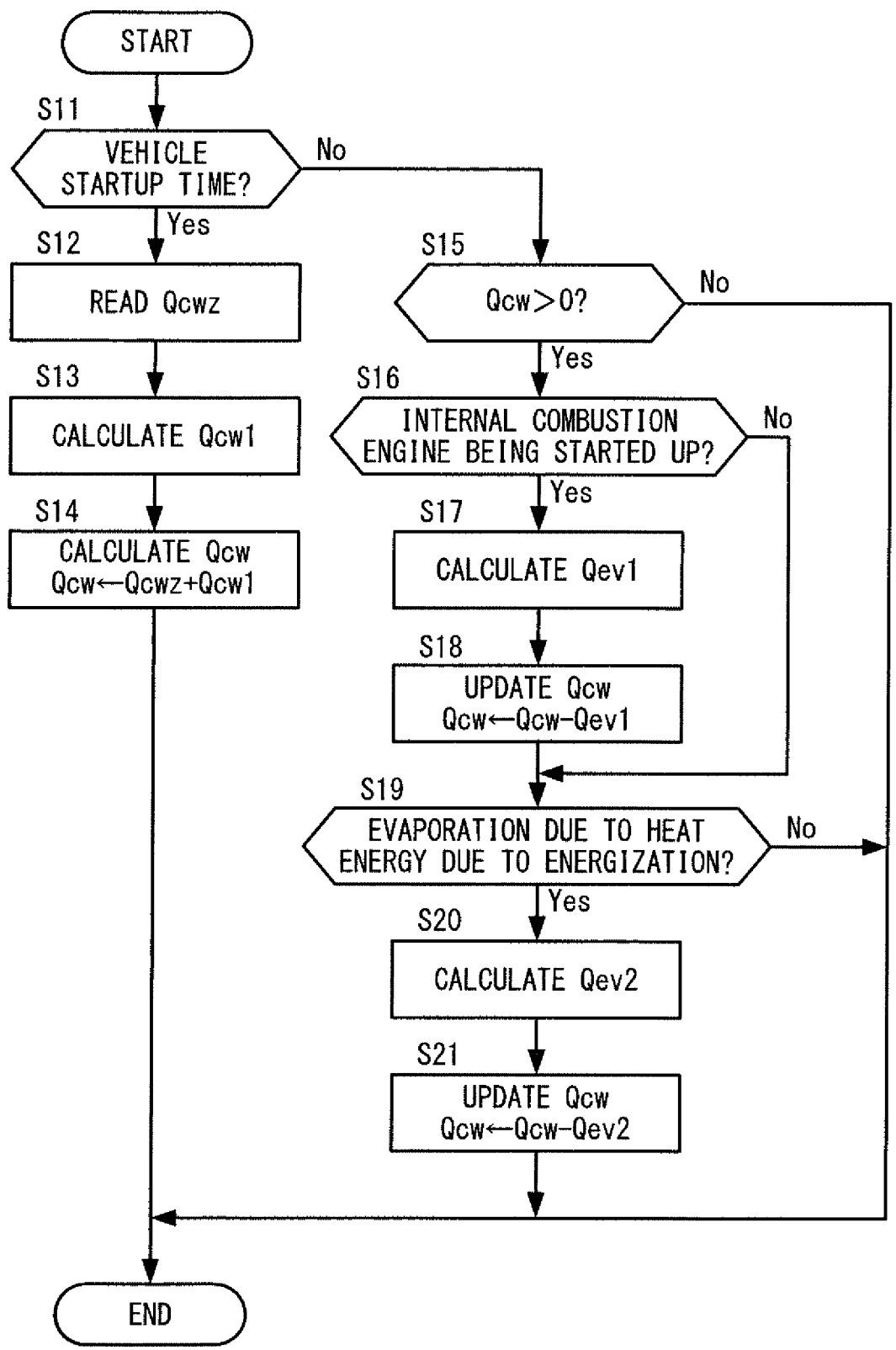
FIG. 6 is a flow chart explaining control for calculation of an amount of internal moisture Qcw of the catalyst device.

FIG. 6 is a flow chart explaining the control for calculation of the amount of internal moisture Qcw of the catalyst device 33. The electronic control unit 200 repeatedly performs the present routine by a predetermined processing cycle from when the vehicle startup switch is turned on to when it is turned off. Note that the vehicle startup switch is a switch which is turned on when starting up the vehicle and is turned off when stopping the vehicle.

At step S11, the electronic control unit 200 judges if it is the time of vehicle startup (that is, when the vehicle startup switch is turned on). If it is the time of vehicle startup, the electronic control unit 200 proceeds to the processing of step S12. On the other hand, if not the time of vehicle startup, the electronic control unit 200 proceeds to the processing of step S15.

At step S12, the electronic control unit 200 reads the previous value of the amount of internal moisture Qcwz. In the present embodiment, the electronic control unit 200 reads the amount of internal moisture Qcw stored in the RAM 203 at the previous time the vehicle was stopped (that is, when the vehicle startup switch was turned off the previous time) as the previous value of the amount of internal moisture Qcwz.

At step S13, the electronic control unit 200 calculates the estimated amount Qcw1 of condensed water generated in the catalyst device 33 from the previous time the vehicle was stopped to the current time the vehicle was started up (below, referred to as the "estimated amount of moisture generated"). In the present embodiment, the electronic control unit 200 calculates the estimated amount of moisture generated Qcw1 based on the substrate temperature at the previous time the vehicle was stopped, the substrate temperature at the current time of vehicle startup, and the outside air temperature. The estimated amount of moisture generated Qcw1 tends to become greater the greater the temperature difference between the substrate temperature at the previous time the vehicle was stopped and the substrate temperature at the current time of vehicle startup.

At step S14, the electronic control unit 200 calculates the previous value of the amount of internal moisture Qcwz plus the estimated amount of moisture generated Qcw1 as the amount of internal moisture Qcw and stores it in the RAM 203.

At step S15, the electronic control unit 200 reads the amount of internal moisture Qcw stored in the RAM 203 and judges if the amount of internal moisture Qcw is larger than 0. If the amount of internal moisture Qcw is larger than 0, the electronic control unit 200 proceeds to the processing of step S16. On the other hand, if the amount of internal moisture Qcw is 0, the electronic control unit 200 ends the current processing.

At step S16, the electronic control unit 200 judges if the internal combustion engine 100 is being started up. If the internal combustion engine 100 is being started up, the electronic control unit 200 proceeds to the processing of step S17. On the other hand, if the internal combustion engine 100 is stopped, the electronic control unit 200 proceeds to the processing of step S19.

At step S17, the electronic control unit 200 calculates the estimated value Qev1 of the amount of moisture per unit time evaporating due to the exhaust heat inside of the catalyst device 33 (below, referred to as the "first amount of evaporated moisture"). In the present embodiment, the electronic control unit 200 refers to a table prepared in advance by experiments etc. and calculates the first amount of evaporated moisture Qev1 based on the temperature of the exhaust flowing into the catalyst device 33 detected by the exhaust temperature sensor 213.

At step S18, the electronic control unit 200 subtracts the first amount of evaporated moisture Qev1 from the amount of internal moisture Qcw to update the value of the amount of internal moisture Qcw.

At step S19, the electronic control unit 200 judges if evaporation occurs at the conductive substrate 35 due to the heat energy input to the conductive substrate 35 due to energization. In the present embodiment, if the conductive substrate 35 is energized and the substrate temperature is a predetermined temperature (temperature near boiling point of water, in the present embodiment, 100[° C.]) or more, the electronic control unit 200 judges that evaporation occurs by the heat energy due to energization and proceeds to the processing of step S20, while if otherwise, judges that evaporation does not occur by the heat energy due to energization and ends the current processing.

At step S20, the electronic control unit 200 calculates the estimated value Qev2 of the amount of moisture per unit time evaporating due to the heat energy input to the conductive substrate 35 by energization (below, referred to as the "second amount of evaporated moisture"). In the present embodiment, the electronic control unit 200 calculates the second amount of evaporated moisture Qev2 based on the heat energy per unit time input to the conductive substrate 35 by energization (amount of power) [kJ] and the latent heat of vaporization per unit mass of water [kJ/cc].

At step S21, the electronic control unit 200 subtracts the second amount of evaporated moisture Qev2 from the amount of internal moisture Qcw to update the value of the amount of internal moisture Qcw.

Figure 7:
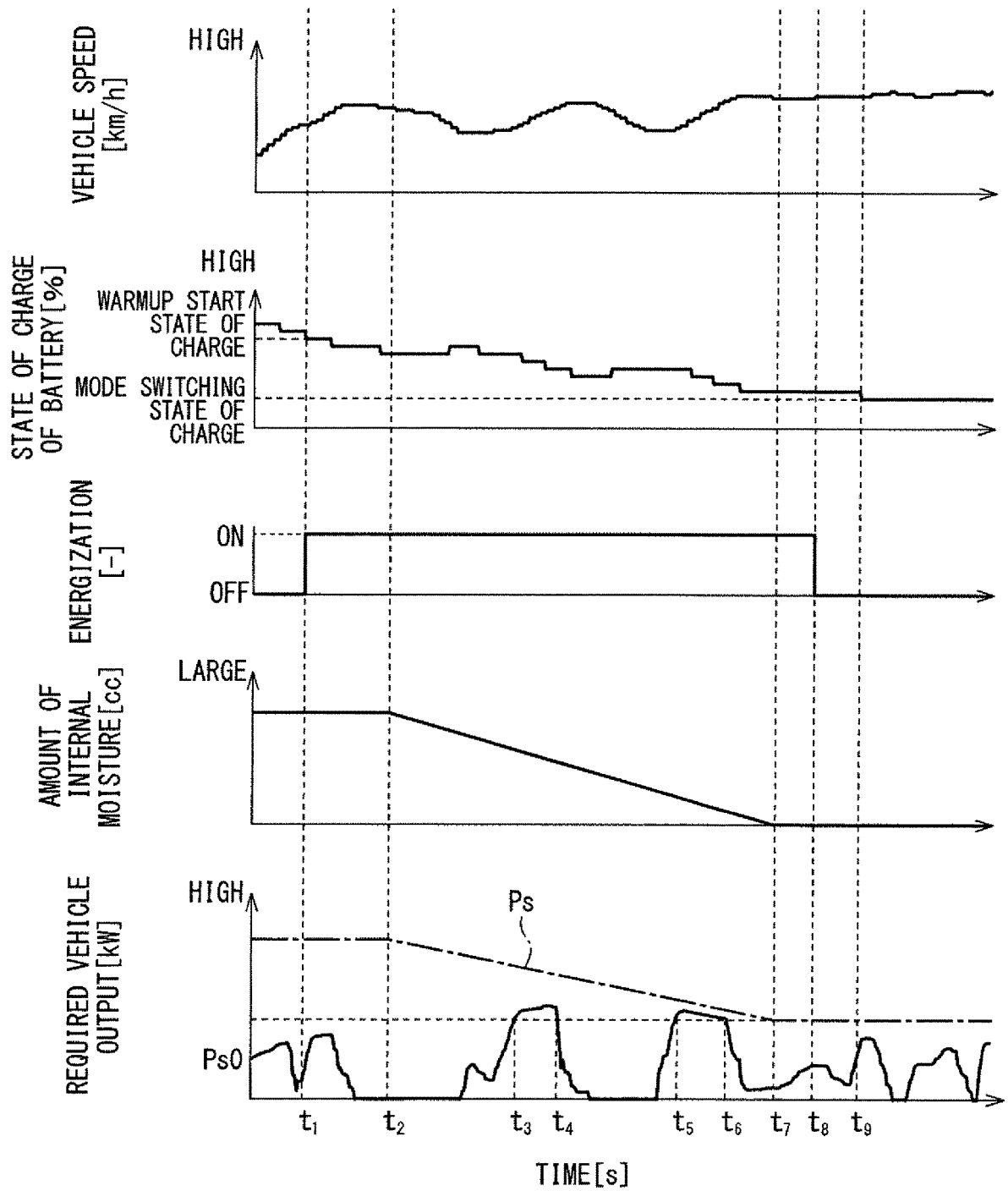
FIG. 7 is a time chart explaining operation of output control in the EV mode according to the first embodiment of the present disclosure.

FIG. 7 is a time chart for explaining the operation of output control during the EV mode according to the present embodiment.

At the time t1, if the state of charge of the battery falls to the state of charge at the start of warm-up, energization of the conductive substrate 35 is started and warm-up of the catalyst device 33 is started. Due to this, if the substrate temperature rises from the initial temperature corresponding to the outside air temperature and rises to near the temperature of evaporation of water at the time t2, the moisture present at the surface or inside of the conductive substrate 35 starts to evaporate. For this reason, at the time t2 on, the amount of internal moisture Qcw of the catalyst device 33 gradually decreases.

At this time, in the present embodiment, basically, the greater the amount of internal moisture Qcw becomes, the higher the ratio of the target output Pm of the second electric rotating machine 60 in the required vehicle output Pt is made while the ratio of the target output Pe of the internal combustion engine 100 in the required vehicle output Pt is lowered. For this reason, the greater the amount of internal moisture Qcw, the higher the required startup output Ps.

Therefore, before the time t2 at which the amount of internal moisture Qcw starts to decrease, the required startup output Ps is set to a value higher than the normal required startup output Ps0. Further, at the time t2 on, the required startup output Ps falls toward the normal required startup output Ps0 as the amount of internal moisture Qcw decreases.

Due to this, in the time periods from the time t3 to the time t4 and the time t5 to the time t6 where the amount of internal moisture Qcw does not fall to 0, even if the required vehicle output Pt becomes the normal required startup output Ps0 or more, there is no need to start up the internal combustion engine 100. All of the required vehicle output Pt is provided by the output of the second electric rotating machine 60. For this reason, the rate of rise of temperature of a portion inside the conductive substrate 35 where no moisture is present can be controlled to a rate of rise of temperature corresponding to the energization power, so the internal temperature difference $\Delta T$ can be kept from becoming excessively large.

If at the time t7 the amount of internal moisture Qcw becomes zero and at the time t8 it is judged that the catalyst supported on the conductive substrate 35 rises to the activation temperature, energization of the conductive substrate 35 is stopped. Further, if, at the time t9, the state of charge of the battery falls to the state of charge at the time of switching the mode, the driving mode is set to the HV mode and the internal combustion engine 100 is started.

The vehicle 110 according to the present embodiment explained above is provided with an internal combustion engine 100, an electrical heated type catalyst device 33 provided at an exhaust passage of the internal combustion engine 100 and including a conductive substrate 35 generating heat upon energization and a catalyst heated through the conductive substrate 35, and an electronic control unit 200 (control device). The electronic control unit 200 is provided with an internal moisture calculating part calculating an amount of internal moisture Qcw comprised of an amount of moisture present inside of the catalyst device 33 and an engine output control part controlling the output of the internal combustion engine 100 based on the required vehicle output Pt and the amount of internal moisture Qcw. Further, the engine output control part is configured so that if moisture is present inside of the catalyst device 33, it restricts the output of the internal combustion engine 100 to a lower output when the amount of internal moisture Qcw is large compared to when it is small.

Due to this, even if the internal combustion engine 100 is started up when moisture is present at the inside of the catalyst device 33, it is possible to lower the exhaust temperature more when the amount of internal moisture Qcw is large compared to when it is small. For this reason, even if the conductive substrate 35 is heated in the state where moisture is present inside of the catalyst device 33, it is possible to keep down the rate of rise of temperature of a portion of the inside of the conductive substrate 35 where moisture is present and in turn possible to keep the internal temperature difference ΔT from becoming excessively large, so it is possible to keep the conductive substrate 35 from deteriorating.

Further, the vehicle 110 according to the present embodiment is still further provided with a second electric rotating machine 60 (electric motor) in addition to the internal combustion engine 100 as sources for driving the vehicle 110. The electronic control unit 200 is still further provided with a motor output control part controlling the output of the second electric rotating machine 60 based on the required vehicle output Pt and the amount of internal moisture Qcw. Further, the engine output control part is configured to lower the target output Pe of the internal combustion engine set based on the required vehicle output Pt more when the amount of internal moisture Qcw is large compared to when it is small. The motor output control part is configured so as to raise the target output Pm of the second electric rotating machine 60 set based on the required vehicle output Pt by the amount of lowering the target output Pe of the internal combustion engine 100 more when the amount of internal moisture Qcw is large compared with when it is small.

In this way, by raising the target output Pm of the second electric rotating machine 60 more when the amount of internal moisture Qcw is large compared to when it is small, it is possible to raise the required startup output Ps during the EV mode when the amount of internal moisture Qcw is large more compared to when it is small. For this reason, even when the required vehicle output Pt, as usual, becomes the normal required startup output Ps0 for starting up the internal combustion engine 100 or more, when the amount of internal moisture Qcw is large, it becomes possible to drive the vehicle without starting up the internal combustion engine 100, that is, by only the output of the second electric rotating machine 60. For this reason, it is possible to keep the internal combustion engine 100 from being started up before starting the energization of the conductive substrate 35 or during energization.

Further, in the present embodiment, the target output Pe of the internal combustion engine 100 set when there is moisture present inside of the catalyst device 33 is made an output where the internal temperature difference ΔT occurring between a portion of the conductive substrate 35 where moisture is present and a portion where no moisture is present in the process of the temperature of the conductive substrate 35 rising becomes less than a predetermined temperature difference.

For this reason, the internal temperature difference ΔT can be reliably kept from becoming a temperature difference causing deterioration of the conductive substrate 35 or more.

Second Embodiment

Next, a second embodiment of the present disclosure will be explained. The present embodiment differs from the first embodiment on the point of the vehicle 110 being a usual vehicle provided with only an internal combustion engine 100 as a source of drive power. Below, this point of difference will be focused on in the explanation.

If the vehicle 110 is a usual vehicle provided with only an internal combustion engine 100 as a source of drive power, basically the conductive substrate 35 starts to be energized and the catalyst device 33 is warmed up together with the startup of the internal combustion engine 100. At this time, if controlling the internal combustion engine 100 so that the output of the internal combustion engine 100 becomes the required vehicle output Pt, the rate of rise of temperature of the conductive substrate 35 ends up depending on the required vehicle output Pt, that is, the output of the internal combustion engine 100. For this reason, it is not possible to control the rate of rise of temperature of the conductive substrate 35 and the conductive substrate 35 is liable to be caused to deteriorate if moisture is present at the inside of the catalyst device 33.

Therefore, in the present embodiment, if moisture is present at the inside of the catalyst device 33, the control device calculates the output upper limit value Pem of the internal combustion engine 100 based on the amount of internal moisture Qcw and operates the internal combustion engine 100 by an output of the output upper limit value Pem or less. Below, the output control according to the present embodiment will be explained.

Figure 8:
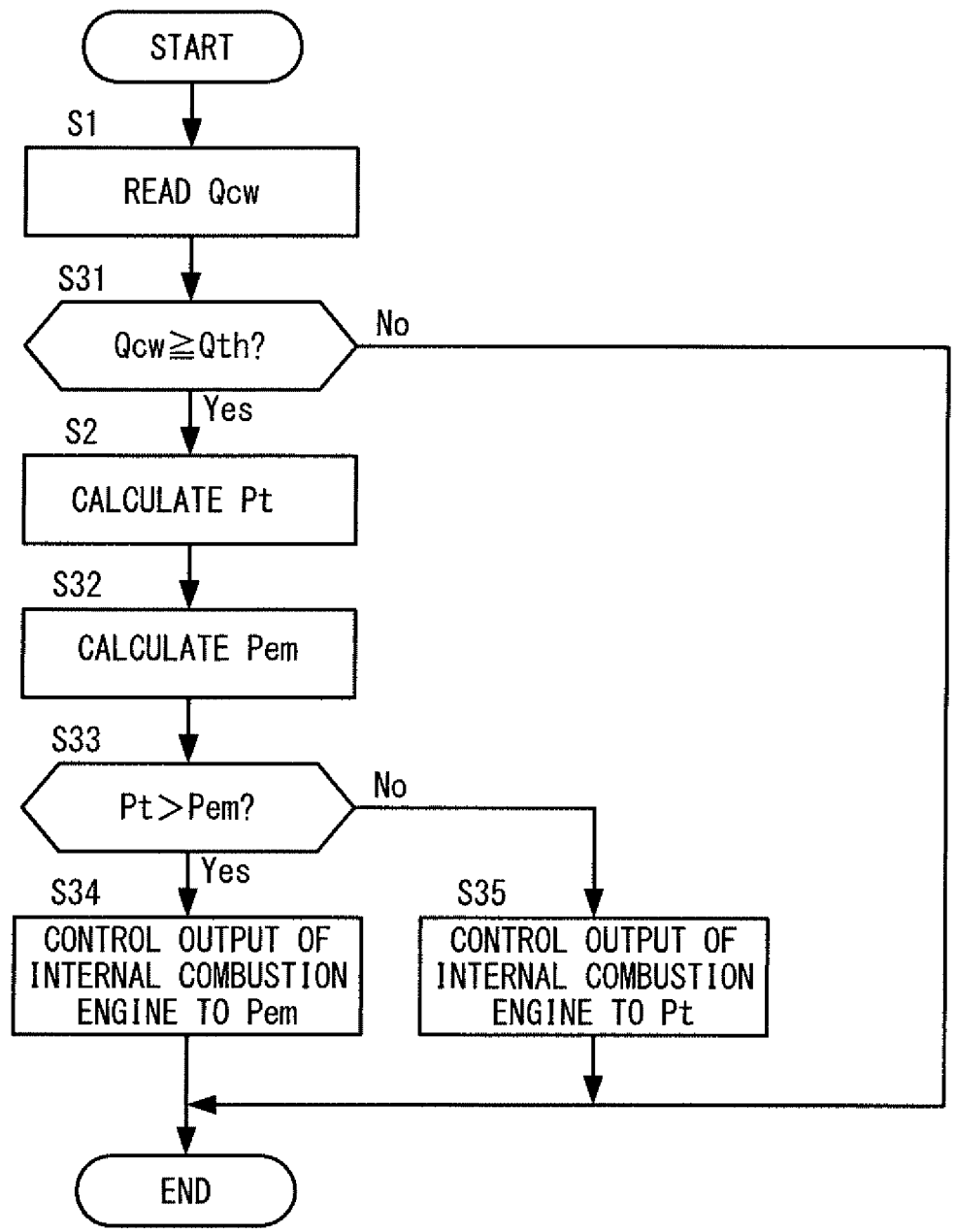
FIG. 8 is a flow chart explaining output control according to a second embodiment of the present disclosure.

FIG. 8 is a flow chart explaining the output control according to the present embodiment. The electronic control unit 200 repeatedly performs the present routine at a predetermined processing cycle during operation of the internal combustion engine 100. Note that, in FIG. 8, the content of the processing of step S1 and step S2 and the method of calculation of the amount of internal moisture Qcw are similar to the above-mentioned first embodiment, so here the explanation will be omitted.

At step S31, the electronic control unit 200 judges if the amount of internal moisture Qcw is a predetermined limit moisture amount Qth or more. The limit moisture amount Qth is the amount of moisture believed to result in the internal temperature difference ΔT becoming a temperature difference liable to cause the conductive substrate 35 to deteriorate or becoming more if operating the internal combustion engine 100 at maximum output, that is, if operating the internal combustion engine 100 at full load. If the amount of internal moisture Qcw is the limit moisture amount Qth or more, the electronic control unit 200 proceeds to the processing of step S32. On the other hand, if the amount of internal moisture Qcw is less than the limit moisture amount Qth, even if operating the internal combustion engine 100 at full load, the electronic control unit 200 judges that the internal temperature difference ΔT does not become a temperature difference liable to cause the conductive substrate 35 to deteriorate or become more and ends the current processing without limiting the output of the internal combustion engine 100.

Figure 9:
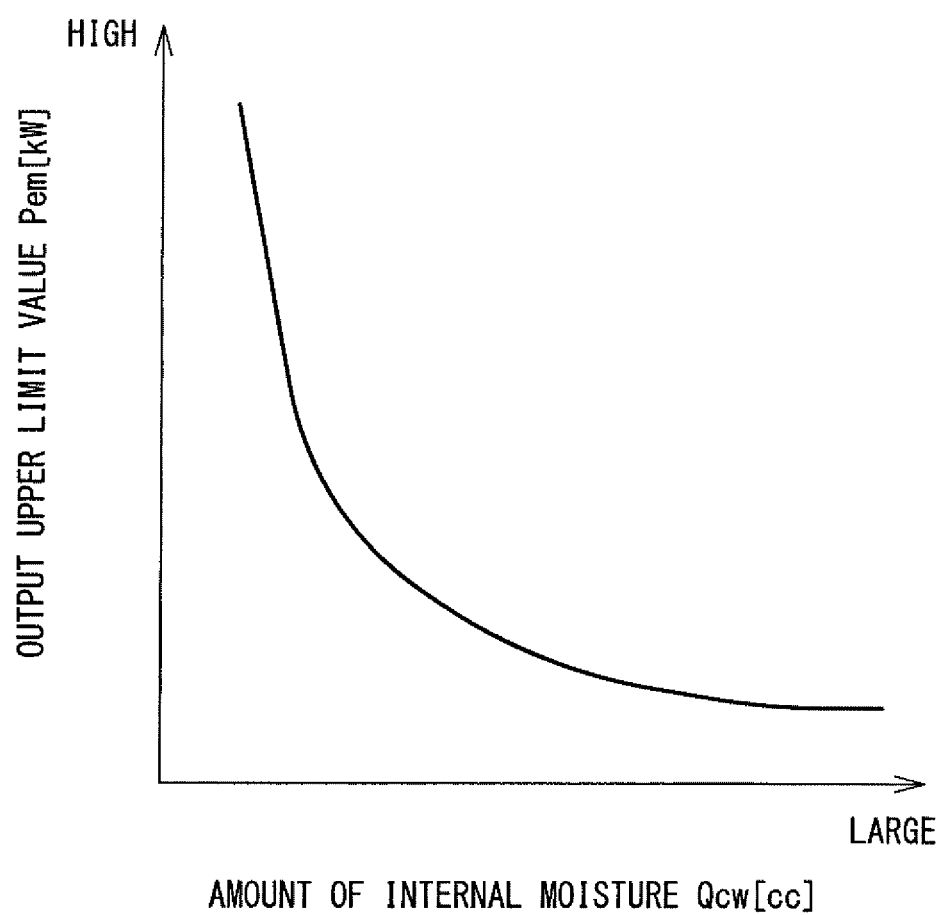
FIG. 9 is a table for calculating an output upper limit value Pem of the internal combustion engine based on the amount of internal moisture Qcw.

At step S32, the electronic control unit 200 refers to the table of FIG. 9 and calculates the output upper limit value Pem of the internal combustion engine 100 based on the amount of internal moisture Qcw. As shown in the table of FIG. 9, the output upper limit value Pem of the internal combustion engine 100 is set to a lower value when the amount of internal moisture Qcw is large compared to when it is small. The output upper limit value Pem of the internal combustion engine 100 set based on the amount of internal moisture Qcw is the output by which, if operating the internal combustion engine 100 by an output higher than this output upper limit value Pem, it is believed that the internal temperature difference ΔT will become a temperature liable to cause deterioration of the conductive substrate 35 or become more due to the moisture present at the surface or inside of the conductive substrate 35.

At step S33, the electronic control unit 200 judges if the required vehicle output Pt is higher than the output upper limit value Pem of the internal combustion engine 100. If the required vehicle output Pt is higher than the upper limit output value Pem of the internal combustion engine 100, the electronic control unit 200 proceeds to the processing of step S34. On the other hand, if the required vehicle output Pt is less than the upper limit output value Pem of the internal combustion engine 100, the electronic control unit 200 proceeds to the processing of step 35.

At step S34, the electronic control unit 200 controls the internal combustion engine 100 so that the output of the internal combustion engine 100 becomes the upper limit output Pem. That is, it restricts the output of the internal combustion engine 100 to the upper limit output Pem.

At step S35, the electronic control unit 200 controls the internal combustion engine 100 so that the output of the internal combustion engine 100 becomes the required vehicle output Pt. This is because if the required vehicle output Pt is less than the output upper limit value Pem of the internal combustion engine 100, even if controlling the internal combustion engine 100 so that the output of the internal combustion engine 100 becomes the required vehicle output Pt, the internal temperature difference ΔT does not become a temperature difference liable to cause the conductive substrate 35 to deteriorate or becomes more.

The engine output control part which the electronic control unit 200 (control device) of the vehicle 110 according to the present embodiment explained above is provided with is configured so that if there is moisture present inside of the catalyst device 33, it restricts the output of the internal combustion engine 100 to a lower output when the amount of internal moisture Qcw is large compared with when it is small. More particularly, the engine output control part is configured to calculate the output upper limit value Pem of the internal combustion engine 100 based on the amount of internal moisture Qcw, restrict the output of the internal combustion engine 100 to the output upper limit value Pem when the required vehicle output Pt is higher than the output upper limit value Pem, and lower the output upper limit value Pem more when the amount of internal moisture Qcw is large compared to when it is small.

Due to this, it is possible to operate the internal combustion engine 100 by the output of the output upper limit value Pem set based on the amount of internal moisture Qcw or less and it is possible to control the exhaust temperature to a constant temperature corresponding to the amount of internal moisture Qcw or less. For this reason, even if the conductive substrate 35 is heated in the state where moisture is present inside of the catalyst device 33, it is possible to keep the rate of rise of temperature of a portion inside of the conductive substrate 35 where no moisture is present from rising and in turn possible to keep the internal temperature difference ΔT from becoming excessively large, so it is possible to keep the conductive substrate 35 from deteriorating.

Further, the engine output control part according to the present embodiment is configured so as to calculate the output upper limit value Pem when the amount of internal moisture Qcw is the limit moisture amount Qth (predetermined moisture amount) or more. The limit moisture amount Qth is made an amount of moisture where when the output of the internal combustion engine 100 is the maximum output, in the process of the temperature of the conductive substrate 35 rising, the internal temperature difference ΔT occurring between a portion of the conductive substrate 35 where there is moisture present and a portion where there is no moisture present becomes a predetermined temperature difference or more.

Due to this, the output of the internal combustion engine 100 is restricted only when the amount of internal moisture Qcw is the limit moisture amount Qth or more, so deterioration of the driving performance of the vehicle due to restriction of the output of the internal combustion engine 100 can be kept to a minimum.

Above, embodiments of the present disclosure were explained, but the above embodiments only show some of the examples of application of the present disclosure and are not meant to limit the technical scope of the present disclosure to the specific constitutions of the above embodiments.

The invention claimed is:

1. A vehicle comprising:
an internal combustion engine;
an electrical heated catalyst device provided in an exhaust passage of the internal combustion engine and including a conductive substrate generating heat upon energization and a catalyst heated through the conductive substrate; and
a control device that is configured to:
calculate an amount of internal moisture comprised of an amount of moisture present at an inside of the catalyst device;
control an output of the internal combustion engine based on a required vehicle output and the amount of internal moisture; and
if moisture is present at the inside of the catalyst device, restrict the output of the internal combustion engine to a lower output when the internal moisture is large compared to when the internal moisture is small.

2. The vehicle according to claim 1, wherein
the vehicle further comprises a drive-use motor in addition to the internal combustion engine as a source of driving the vehicle, and
the control device is further configured to:
control an output of the drive-use motor based on the required vehicle output and the amount of internal moisture,
lower a target output of the internal combustion engine set based on the required vehicle output more when the amount of internal moisture is large compared with when the amount of internal moisture is small, and
raise a target output of the drive-use motor set based on the required vehicle output by the amount of lowering the target output of the internal combustion engine more when the amount of internal moisture is large compared with when the amount of internal moisture is small.

3. The vehicle according to claim 2 wherein
the target output of the internal combustion engine set when moisture is present at the inside of the catalyst device is an output whereby a temperature difference occurring between a portion of the conductive substrate where moisture is present and a portion where moisture is not present becomes less than a predetermined temperature difference in a process of a temperature of the conductive substrate rising.

4. The vehicle according to claim 1, wherein the control device is further configured to:
calculate an output upper limit value of the internal combustion engine based on the amount of internal moisture and restrict the output of the internal combustion engine to an output upper limit value when the required vehicle output is higher than the output upper limit value; and
lower the output upper limit value more when the amount of internal moisture is large compared to when the amount of internal moisture is small.

5. The vehicle according to claim 4, wherein
the control device is configured to calculate the output upper limit value when the amount of internal moisture is a predetermined moisture amount or more and
the predetermined moisture amount is an amount of moisture whereby a temperature difference occurring between a portion of the conductive substrate where moisture is present and a portion where moisture is not present becomes a predetermined temperature difference or more in a process of a temperature of the conductive substrate rising if the output of the internal combustion engine is a maximum output.

6. A method of control for a vehicle,
the vehicle comprising:
an internal combustion engine; and
an electrical heated catalyst device provided in an exhaust passage of the internal combustion engine and including a conductive substrate generating heat upon energization and a catalyst heated through the conductive substrate, wherein
the method comprises:
calculating an amount of internal moisture comprised of an amount of moisture present at an inside of the catalyst device;
controlling an output of the internal combustion engine based on a required vehicle output and the amount of internal moisture; and
restricting the output of the internal combustion engine to a lower output when the internal moisture is large compared to when the internal moisture is small if moisture is present at the inside of the catalyst device.

* * * * *